United States Patent [19]

Shibayama

[11] Patent Number: 5,694,253

[45] Date of Patent: Dec. 2, 1997

[54] HIGH ZOOM RATIO ZOOM LENS

[75] Inventor: Atsushi Shibayama, Tokyo, Japan

[73] Assignee: Nikon Corporation, Tokyo, Japan

[21] Appl. No.: 595,031

[22] Filed: Jan. 31, 1996

[30]  Foreign Application Priority Data

Feb. 2, 1995 [JP] Japan .................. 7-015608
Mar. 1, 1995 [JP] Japan .................. 7-041153

[51] Int. Cl.[6] .................................................. G02B 15/14
[52] U.S. Cl. ........................ 359/690; 359/684; 359/687
[58] Field of Search ............................... 359/687, 690, 359/684, 682, 681

[56]  References Cited

U.S. PATENT DOCUMENTS

| 4,632,519 | 12/1986 | Takahashi | 359/687 |
| 4,657,351 | 4/1987 | Mori | 359/687 |
| 4,890,904 | 1/1990 | Ito | 359/687 |
| 5,337,187 | 8/1994 | Fukino et al. | 359/687 |

FOREIGN PATENT DOCUMENTS

| 58-127908 | 7/1983 | Japan . |
| 58-224323 | 12/1983 | Japan . |
| 60-14213 | 1/1985 | Japan . |
| 60-221717 | 11/1985 | Japan . |
| 62-270910 | 11/1987 | Japan . |
| 63-70819 | 3/1988 | Japan . |
| 63-205628 | 8/1988 | Japan . |

Primary Examiner—David C. Nelms
Assistant Examiner—Jordan M. Schwartz
Attorney, Agent, or Firm—Oliff & Berridge

[57]  ABSTRACT

A compact zoom lens has a high zoom ratio that is suitable for a single lens reflex camera. Embodiments of the zoom lens include, in order from the object side, a first lens unit of positive refractive power, a second lens unit of negative refractive power, and a third lens unit of positive refractive power, that all move toward the object during zooming from the maximum wide-angle state to the maximum telephoto state, with the distance between the first lens unit and the second lens unit increasing, and the distance between the second lens unit and the third lens unit decreasing; and wherein various conditions are satisfied. The zoom lens may include a focal length shorter than the length of the diagonal of the effective picture plane and a focal length longer than three times the length of the diagonal of the effective picture plane, and includes a fourth lens unit of positive refractive power on the image side of the third lens unit, wherein during zooming from the maximum wide-angle state to the maximum telephoto state, the distance between the third lens unit and the fourth lens unit decreases with the fourth lens unit also moving toward the object.

20 Claims, 14 Drawing Sheets

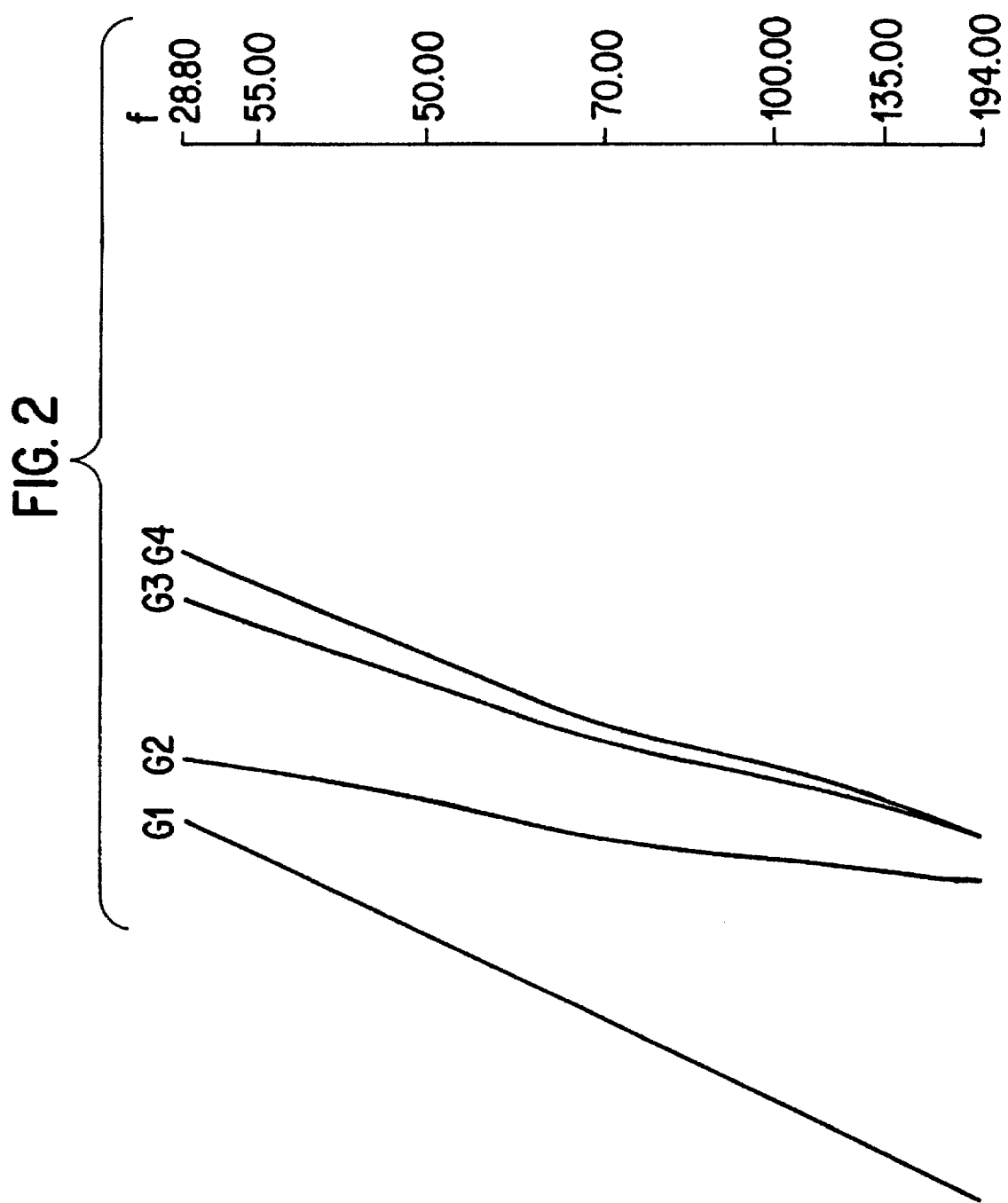

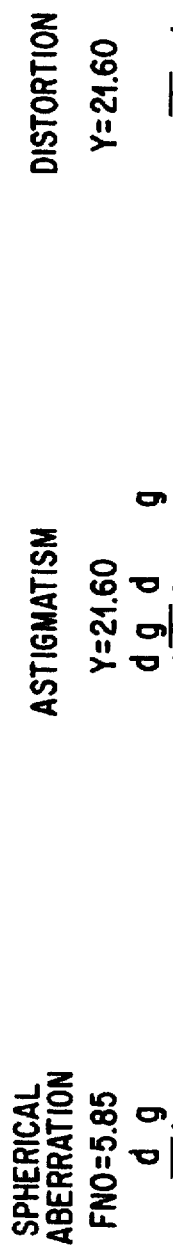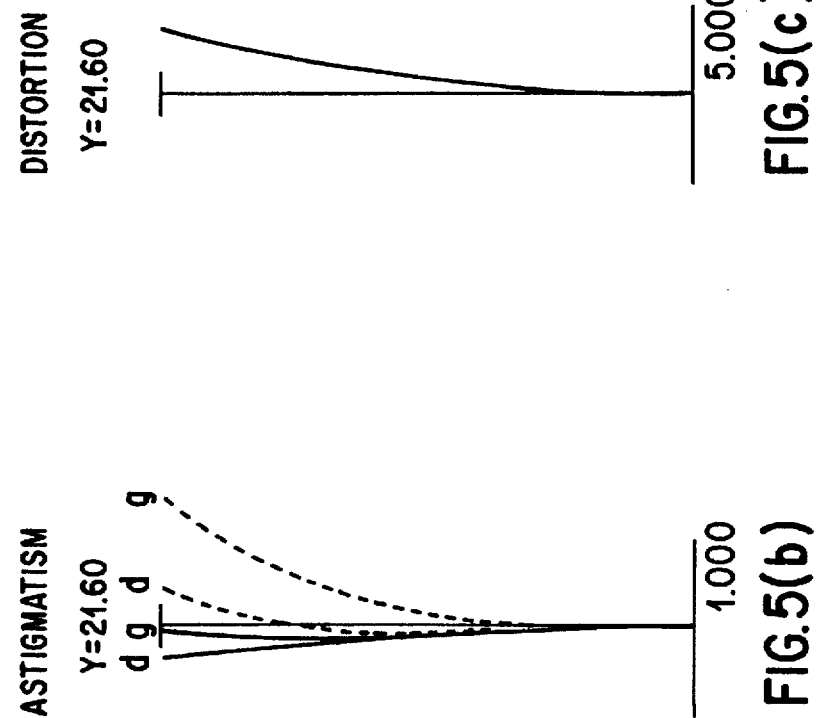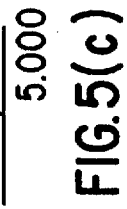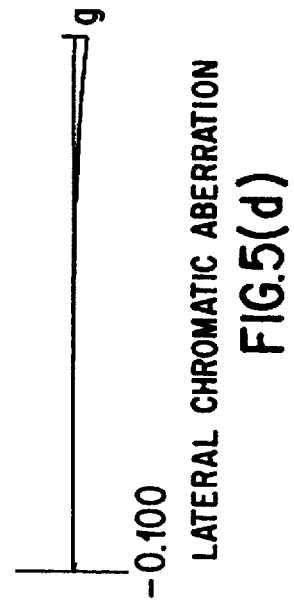

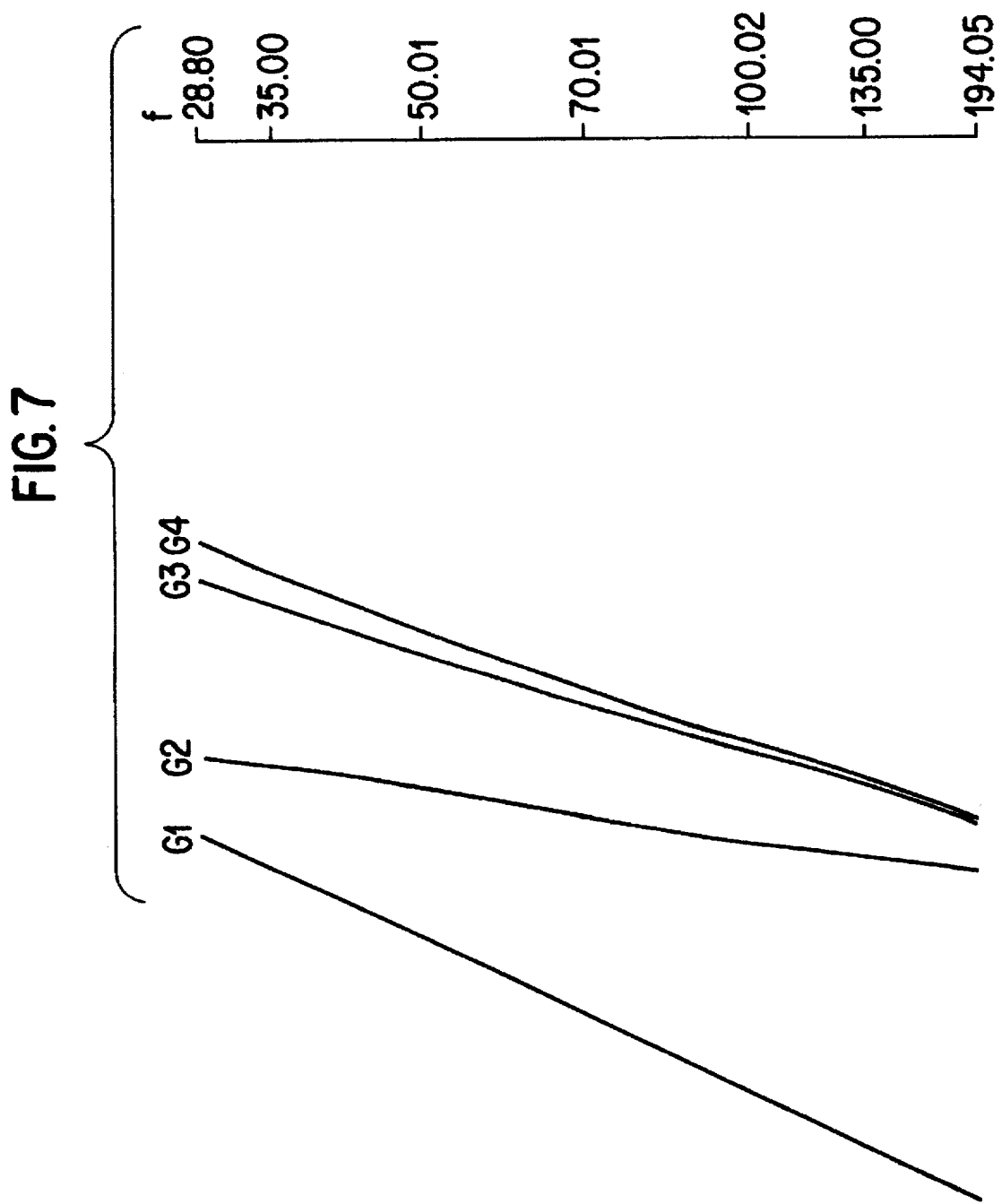

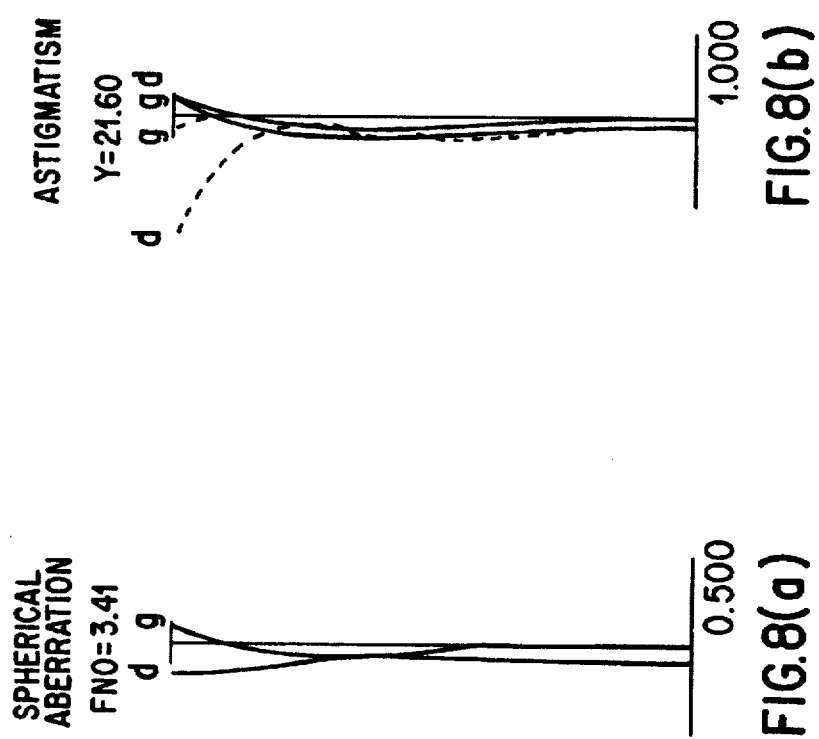
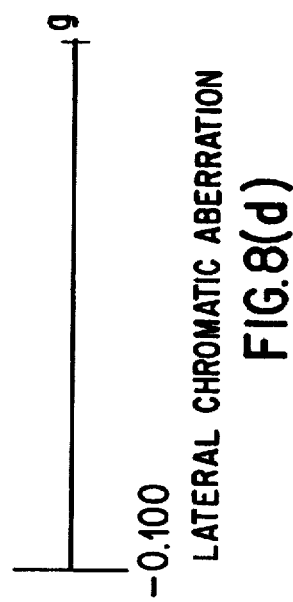

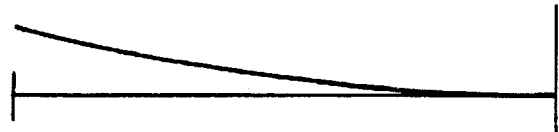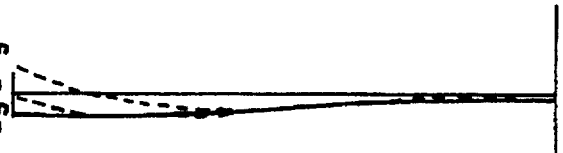

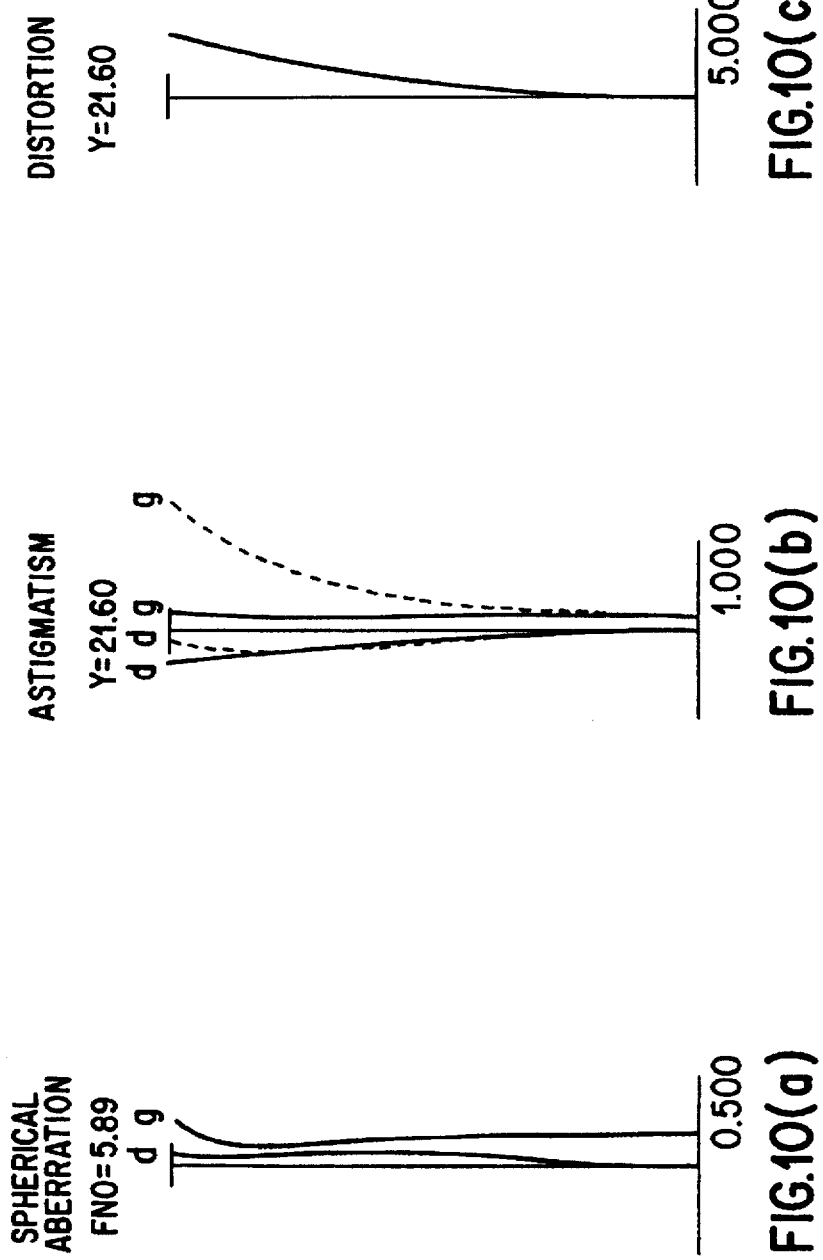

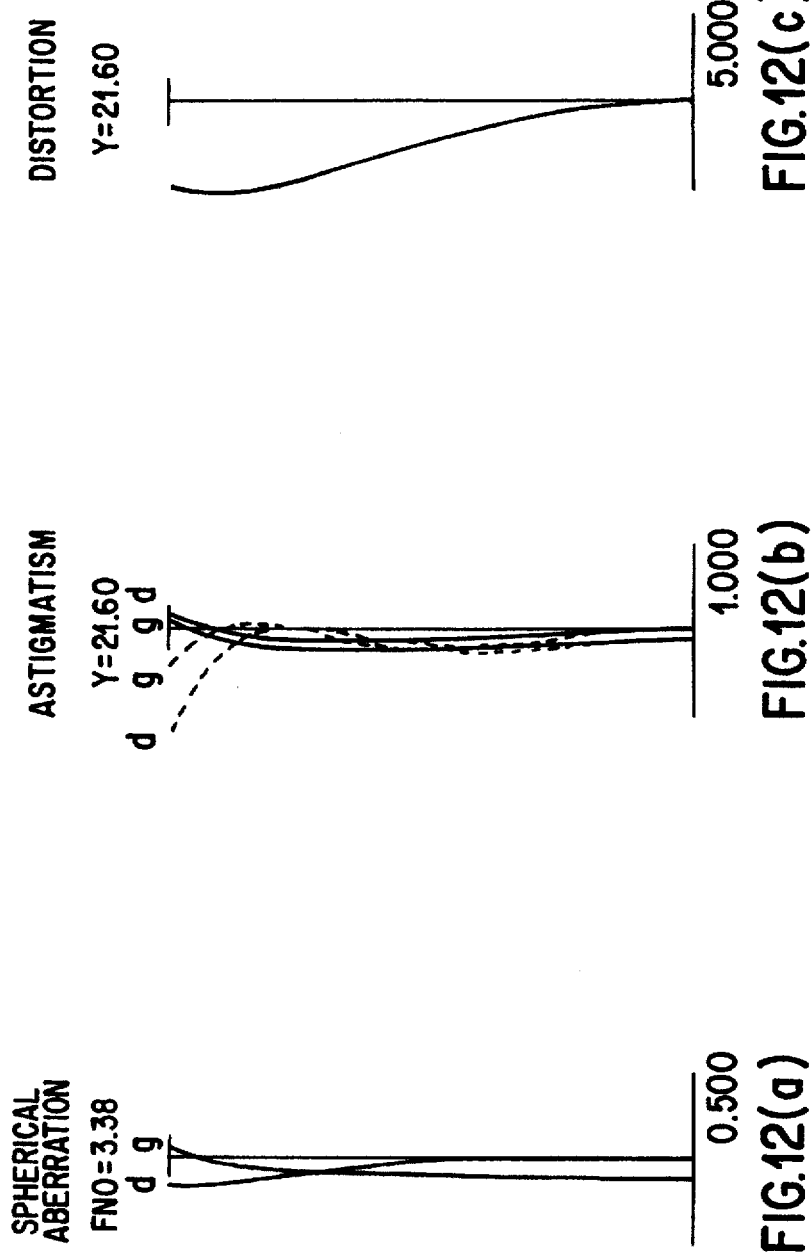

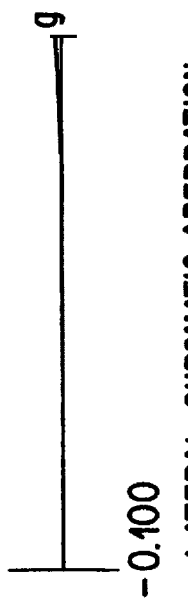
FIG.13(a) SPHERICAL ABERRATION FNO=4.63
FIG.13(b) ASTIGMATISM Y=21.60
FIG.13(c) DISTORTION Y=21.60
FIG.13(d) LATERAL CHROMATIC ABERRATION

HIGH ZOOM RATIO ZOOM LENS

BACKGROUND OF THE INVENTION

1. Field of the Invention

The present invention relates to zoom lenses, in particular, to compact zoom lensees having high zoom and that are suitable for single lens reflex cameras.

2. Description of Related Art

In recent years, zoom lenses have come to have higher zoom ratios, and various kinds of zoom lenses, having both a focal length shorter than the length of the diagonal of the effective picture plane and a focal length longer than three times the length of the diagonal of the effective picture plane, have been proposed.

Zoom lenses having four lens units of positive-negative-positive-positive arrangement from the object side have been proposed, for example, in Japanese Laid-Open Patent Publication Sho 58-127908, Japanese Laid-Open Patent Publication Sho 58-224323, Japanese Laid-Open Patent Publication Sho 60-14213, Japanese Laid-Open Patent Publication Sho 60-221717, Japanese Laid-Open Patent Publication Sho 62-270910, Japanese Laid-Open Publication Sho 62-270910, Japanese Laid-Open Patent Publication Sho 63-70819.

However, compactness is insufficient because the total length of the zoom lens at the maximum wide-angle state is longer than 0.8 times the focal length of the zoom lens at the maximum tlephoto state in the embodiments of those Japanese Laid-Open Patent Publications.

In addition, when the attempt is made to realize both compactness and high zoom ratio, an eclipse of the chief light ray is created at the intermediate focal length of the zoom lens. This problem becomes very important when focussing on close objects is conducted by moving the first lens unit, thereby making it necessary to increase the diameter of the first lens unit.

Besides four unit zoom lenses having positive-negative-positive-positive arrangement, zoom lenses having five lens units of positive-negative-positive-negative-positive arrangement from the object side have also been proposed, for example, in Japanese Laid-Open Patent Publication Sho 63-205628.

However, in the positive-negative-positive-negative-positive five unit zoom lens, the use of five lens units creates problems of increasing costs and the zoom lens becoming large and complex due to the increase in the number of components, making it difficult to provide a compact, inexpensive zoom lens.

SUMMARY OF THE INVENTION

It is an object of the invention to provide a zoom lens that enables both a high zoom ratio and compactness of total length, while eliminating eclipsing of the chief light ray over the entire zoom region and also making the effective diameter of the first lens unit smaller.

A high zoom ratio zoom lens of the first and second embodiments of the invention includes, in order from an object side, a first lens unit of positive refractive power, a second lens unit of negative refractive power, and a third lens unit of positive refractive power, wherein during zooming from the maximum wide-angle state to the maximum telephoto state, all of the lens units from the first through the third lens units are caused to move toward the object such that the distance between the first lens unit and the second lens unit increases, and the distance between the second lens unit and the third lens unit decreases; and wherein the following conditions are satisfied, where fw is the focal length at the maximum wide-angle state, m1 and m2 are respectively the zooming displacements of the first lens unit and the second lens unit from the maximum wide-angle state to a focal length state having a focal length f, and K(f) is defined to be m2/m1:

When $fw < f < 2fw$, $0.15 < K(f) < 0.45$ (1)

When $2fw < f < 3fw$, $0.25 < K(f) < 0.5$ (2)

When $3fw < f < 4fw$, $0.3 < K(f) < 0.45$ (3)

When $4fw < f < 5fw$, $0.25 < K(f) < 0.4$ (4)

When $5fw < f$, $0.2 < K(f) < 0.4$. (5)

Furthermore, it is desirable the following conditions be satisfied, where ft is the focal length at the maximum telephoto state, K(ft) is defined as the ratio of the zooming displacements of the first and second lens units from the maximum wide-angle state to the maximum telephoto state, K(5fw) is defined as the ratio of the zooming displacements of the first and second lens units from the maximum wide-angle state to the focal length state having a focal length for the entire zoom lens of 5fw, i.e., five times the focal length of the maximum wide-angle state, K(3fw) is defined as the ratio of the zooming displacements of the first and second lens units from the maximum wide-angle state to the focal length state having a focal length for the entire zoom lens of 3fw, K(2fw) is defined as the ratio of the zooming displacements of the first and second lens units from the maximum wide-angle state to the focal length state having a focal length for the entire zoom lens of 2fw, and K(1.5fw) is defined as the ratio of the zooming displacements of the first and second lens units from the maximum wide-angle state to the focal length state having a focal length for the entire zoom lens of 1.5fw:

$$K(ft) < K(5fw) < K(3fw)$$ (6)

$$K(1.5fw) < K(2fw)$$ (7)

Furthermore, it is desirable for the zoom lens to further comprise a positive fourth lens unit on the image side of the third lens unit, wherein during zooming from the maximum wide-angle state to the maximum telephoto state, the fourth lens unit is caused to move toward the object such that the distance between the third lens unit and the fourth lens unit decreases.

In the invention, a zoom lens having a positive-negative-positive three lens unit arrangement is used, and zooming from the maximum wide-angle state to the maximum telephoto state is conducted by causing the distance between the first lens unit and the second lens unit to increase, and the distance between the second lens unit and the third lens unit to decrease. When this occurs, the total length of the zoom lens at a maximum wide-angle state can be made smaller by causing each of the lens units, particularly the second lens unit, to move toward the object.

In addition, the ratio of the zooming displacement of the second lens unit with respect to the first lens unit from a maximum wide-angle state is made large at an intermediate focal length state in comparison to a maximum wide-angle state and a maximum telephoto state. Thereby eclipse of the chief light ray is prevented over the entire zoom range and the effective diameter of the first lens unit can be made smaller.

Hereafter, the purposes of various conditions of various embodiments of the invention are explained.

Condition (5) stipulates the ratio of the zooming displacement from the maximum wide-angle state of the first lens unit and the second lens unit in a zoom range in which the focal length exceeds five times the focal length at the maximum wide-angle state. When the lower limit in condition (5) is exceeded, the zooming displacement of the second lens unit toward the object direction becomes smaller, making it difficult to minimize the total length at the maximum wide-angle state. Conversely, when the upper limit in condition (5) is exceeded, the zooming displacement of the first lens unit becomes extremely large when the change in the distance between the first lens unit and the second lens unit becomes large due to a higher zooming ratio, making it difficult for the zoom cam groove of the first lens unit to be provided on the zoom lens barrel.

Conditions (1) through (4) prevent eclipsing at intermediate focal length states, and furthermore, are conditions for conducting good aberration correction.

When any of the lower limits in conditions (1) through (4) are exceeded, eclipsing is created and the brightness at the edge of the image field decreases at an intermediate focal length state, or the effective diameter of the first lens unit must be made larger, which is undesirable. Conversely, when any of the upper limits in conditions (1) through (4) are exceeded, it becomes difficult to correct well various aberrations in the entire zoom region, particularly astigmatism.

Conditions (6) and (7) further strengthen conditions (1) through (5) to further prevent eclipsing at intermediate focal length states. When conditions (6) and (7) are not satisfied, eclipsing is created and the brightness of the edge of the image field decreases at intermediate focal length states, or the effective diameter of the first lens unit must be made larger, which is undesirable.

In addition, if the zoom lens is configured with a positive fourth lens unit positioned on the image side of the third lens unit, such that the fourth lens unit moves toward the object direction and the distance between the third lens unit and the fourth lens unit becomes smaller when zooming from the maximum wide-angle state to the maximum telephoto state, good correction of astigmatism over the entire zoom range can be achieved.

It is also an object of the present invention to provide a compact zoom lens in which the positive-negative-positive-positive four unit zoom lens arrangement is used, a high zoom ratio and low cost are made compatible with each other, and the total length of the zoom lens at a maximum wide-angle state is made less than 0.8 times the focal length of the zoom lens at a maximum telephoto state.

In order to achieve the above and other objectives, the high zoom ratio zoom lens according to the invention includes both a focal length shorter than the length of the diagonal of the effective picture plane, and a focal length longer than three times the length of the diagonal of the effective picture plane, and includes, in order from the object side, a first lens unit of positive refractive power, a second lens unit of negative refractive power, a third lens unit of positive refractive power and a fourth lens unit of positive refractive power, wherein during zooming from the maximum wide-angle state to the maximum telephoto state, the distance between the first lens unit and the second lens unit increases, the distance between the second lens unit and third lens unit decreases, and the distance between the third lens unit and the fourth lens unit decreases, while all of the lens units from the first lens unit through the fourth lens unit move toward the object, and furthermore the following conditions are satisfied:

$$0.05 < |f2|/ft < 0.10 \quad (f2<0) \tag{8}$$

$$Z34 > 2 \tag{9}$$

$$mv1/fw > 1.5 \tag{10}$$

$$0.2 < mv2/mv1 < 0.5 \tag{11}$$

where ft is the focal length of the zoom lens at a maximum telephoto state, fw is the focal length of the zoom lens at a maximum wide-angle state, f2 is the focal length of the second lens unit, $Z34 = \beta34t/\beta34w$, where $\beta34t$ is the combined imaging magnification of the third lens unit and the fourth lens unit at a maximum telephoto state, $\beta34w$ is the combined imaging magnification of the third lens unit and the fourth lens unit at a maximum wide-angle state, mv1 is the displacement of the first lens unit during zooming from the maximum wide-angle state to the maximum telephoto state, and mv2 is the displacement of the second lens unit during zooming from the maximum wide-angle state to the maximum telephoto state.

In addition, it is preferable for the high zooming ratio zoom lens of the invention to satisfy the following conditions:

$$0.7 < mv3/mv4 < 0.95 \tag{12}$$

$$1.1 < mv4/fw < 1.8 \tag{13}$$

where mv3 is the displacement of the third lens unit during zooming from a maximum wide-angle state to a maximum telephoto state, and mv4 is the displacement of the fourth lens unit during zooming from a maximum wide-angle state to a maximum telephoto state.

It is also preferable for the high zoom ratio zoom lens of the invention to satisfy the following condition:

$$1.2 < Z2/Z34 < 1.6 \tag{14}$$

where $Z2 = \beta2t/\beta2w$, wherein $\beta2t$ is the imaging magnification of the second lens unit at a maximum telephoto state, and $\beta2w$ is the imaging magnification of the second lens unit at a maximum wide-angle state.

It is also preferable for the high ratio zoom lens of the invention to satisfy the following condition:

$$0.5 < f3/f4 < 1.0 \tag{15}$$

where f3 is the focal length of the third lens unit, and f4 is the focal length of the fourth lens unit.

It is also preferable for the high zoom ratio zoom lens of the invention to use a fourth lens unit that includes, in order from the object side, a positive biconvex lens having an aspheric lens surface on an object side and a negative meniscus lens having a convex lens surface facing an object side.

In addition, it is also preferable for a high zoom ratio zoom lens of the invention for the following condition be satisfied:

$$0.05 < T4/ft < 0.15 \tag{16}$$

where T4 is the on-axis thickness of the fourth lens unit.

It is also preferable for a high zoom ratio zoom lens of the invention for the following condition be satisfied:

$$0.7 < (Bf4+T4/2)/f4 < 1.0 \tag{17}$$

where Bf4 is the back focus of the fourth lens unit alone, and f4 is the focal length of the fourth lens unit.

It is also preferable for a high zoom ratio zoom lens of the invention for the following condition to be satisfied:

$$0.01 < A/f4 < 0.1 \quad (18)$$

where A is the distance between the positive biconvex lens and the negative meniscus lens, and f4 is the focal length of the fourth lens unit.

In a high zoom lens of the invention, it is also preferable for focussing from distant objects to close objects to be conducted by causing the second lens unit to move in the direction of an object. In this case, it is also desirable for the following conditions to be satisfied:

$$0.7 < \beta 2t < 0.9 \quad (\beta 2t < 0) \quad (19)$$

where β2t is the imaging magnification of the second lens unit at a maximum telephoto state.

In addition, when focussing is conducted using the second lens unit, it is desirable for the first lens unit to include, in order from an object side, a negative meniscus lens having a convex lens surface facing an object side, a first positive meniscus lens having a convex lens surface facing an object side, and a second positive meniscus lens having a convex lens surface facing an object side.

In a high zoom ratio zoom lens he invention, it is also desirable for the following condition be satisfied:

$$0.5 < r3/r5 < 2 \quad (20)$$

where r3 is a radius of curvature of a lens surface of the first positive meniscus lens on a side toward an image, and r5 is a radius of curvature of a lens surface of the first positive meniscus lens on a side toward an image. In addition, in this case it is desirable for the negative meniscus lens and the first positive meniscus lens to be cemented together.

In the various embodiments of the invention, a positive-negative-positive-positive four unit zoom lens is used, and the zoom lens is made compact and with a high zoom ratio by causing each of the lens units to move in the direction of an object when zooming from the maximum wide-angle state to the maximum telephoto state.

Hereafter, the purposes of various conditions of various embodiments of the invention are described.

Condition (8) stipulates the focal length of the second lens unit with respect to the focal length ft of the zoom lens at the maximum telephoto state. When the upper limit in condition (8) is exceeded, increasing the zoom ratio becomes difficult because the focal length of the second lens unit becomes large. Conversely, when the lower limit in condition equation (8) is exceeded, the focal length of the second lens unit becomes small, and correction of the various aberrations becomes difficult.

Condition (9) stipulates the zoom ratio satisfied by the third lens unit and the fourth lens unit. When the lower limit in condition (9) is exceeded, the contribution to the zoom ratio of the third lens unit and the fourth lens unit becomes small, and the contribution to the zoom ratio of the second lens unit in order to achieve a high zoom ratio becomes very large. Consequently, the change in imaging magnification of the second lens unit becomes very large, causing large fluctuations in the various aberrations during zooming, making aberra ion correction difficult.

Condition (10) stipulates the displacement of the first lens unit with respect to the focal length of the zoom lens at the maximum wide-angle state. When the lower limit in condition (10) is exceeded, the change in the total length of the zoom lens from the maximum telephoto state to the maximum wide-angle state becomes small, so that when an attempt is made to make the total length of the zoom lens small at the maximum wide-angle state, it becomes difficult to correct spherical aberration and chromatic aberration at a maximum telephoto state.

Condition (11) stipulates the ratio of the displacement of the second lens unit to the displacement of the first lens unit during zooming from the maximum wide-angle state to the maximum telephoto state. When the lower limit in condition (11) is exceeded, the displacement of the second lens unit becomes small, making it difficult to make the total length at a maximum wide-angle state smaller, which is undesirable because the effective diameter of the first lens unit becomes larger. Conversely, when the upper limit in condition (11) is exceeded, the change in the distance between the first lens unit and the second lens unit during zooming becomes small, making it difficult to achieve a high zoom ratio.

Condition (12) stipulates the ratio of the displacement of the third lens unit to the displacement of the fourth lens unit during zooming from the maximum wide-angle state to the maximum telephoto state. When either the upper limit or the lower limit in condition (12) is exceeded, fluctuations in astigmatism during zooming become larger, making correction difficult.

Condition (13) stipulates the displacement of the fourth lens unit with respect to the focal length of the zoom lens at maximum wide-angle state. When the upper limit in condition (13) is exceeded, the back focus of the zoom lens at a maximum telephoto state becomes large, and consequently, when an attempt is made to obtain an aperture ratio on the order of F/5.6 at a maximum telephoto state, the effective diameter of the fourth lens unit becomes larger, preventing achieving compactness. Conversely, when the lower limit in condition (13) is exceeded, it is difficult to make the total length of the zoom lens at a maximum wide-angle state smaller.

Condition (14) stipulates the zoom ratio contributed by the second lens unit with respect to the zoom ratio contributed by the third lens unit and fourth lens unit. When the upper limits in condition (14) is exceeded, the contribution to the zoom ratio of the second lens unit becomes larger, causing fluctuations in the aberrations during zooming to become larger, making aberration correction difficult. Conversely, when the lower limit in condition (14) is exceeded and an attempt is made to obtain an aperture ratio on the order of F/5.6 at a maximum telephoto state, the stop diameter and the effective diameters of the third and fourth lens units become large, which prevents making the zoom lens compact.

Condition (15) stipulates the ratio between the focal lengths of the third lens unit and the fourth lens unit. When the upper limit in condition (15) is exceeded, the position of the principal point of the combination of third lens unit and the fourth lens unit is separated from the second lens unit, and consequently, it becomes difficult to achieve both a high zoom ratio and compactness in total length. Conversely, when the lower limit in condition (15) is exceeded, the focal length of the third lens unit becomes shorter, making it difficult to include only about three lenses in the third lens unit. Consequently, the number of lenses needed for the third lens unit increases and the third lens unit becomes larger, which is undesirable because this tends to increase the total length of the zoom lens system and increase costs.

It is necessary to optimize the displacement and refractive power arrangement of each of the lens units in order to minimize the total length, but it is also necessary to optimize the composition of the fourth lens unit. When the fourth lens unit includes, in order from the object side, a positive biconvex lens and a negative meniscus lens having a convex lens surface facing an object side, the fourth lens unit has a telephoto-type structure, which is beneficial in terms of correction of negative distortion at a maximum wide-angle state and in terms of minimizing the total length of the zoom lens system.

In addition, when the object-side lens surface of the biconvex lens, which is positioned closest to an object in the fourth lens unit, is aspheric, it is possible to favorably correct spherical aberration and coma.

Condition (16) stipulates the on-axis thickness of the fourth lens unit. When the upper limit in condition (16) is exceeded, the on-axis thickness of the fourth lens unit becomes large, making it difficult to make the zoom lens compact. Conversely, when the lower limit in condition (16) is exceeded, the on-axis thickness of the fourth lens unit becomes smaller, making correction of aberrations difficult.

Condition (17) stipulates the relationship between the center position of the fourth lens unit and the principal point position. When the lower limit in condition (17) is exceeded, the center point of the fourth lens unit becomes greatly separated from the principal point of the fourth lens unit toward the picture plane side, which is undesirable because aberration correction in the fourth lens unit becomes difficult. Conversely, when the upper limit in condition (17) is exceeded, the fourth lens unit ceases to be of telephoto-type structure, making it difficult to minimize the total length of the zoom lens.

In addition, condition (18) stipulates the appropriate range for the distance between the positive biconvex lens and the negative meniscus lens having a convex lens surface facing an object side in the fourth lens unit. When the lower limit in condition (18) is exceeded, correction of aberrations in the fourth lens unit becomes difficult. Conversely, when the upper limit in condition (18) is exceeded, the on-axis thickness of the fourth lens unit becomes larger, making it difficult to minimize the total length of the zoom lens.

In addition, it is desirable to conduct focussing from distant objects to close objects by causing the second lens unit to move in an object direction, in order to make the effective diameter of the first lens unit smaller and make the zoom lens more compact. In this case, it is desirable that condition (19) be satisfied.

Condition (19) stipulates the imaging magnification of the second lens unit at a maximum telephoto state. When the upper limit in condition (19) is exceeded, the displacement of the second lens unit needed for focussing near the maximum telephoto state becomes extremely large, or focussing becomes impossible. Conversely, when the lower limit in condition (19) is exceeded, making it difficult to minimize the total length of the zoom lens.

In addition, when focussing is conducted by causing the second lens unit to move, it is preferable for the first lens unit to include, in order from the object side, a negative meniscus lens having a convex lens surface facing an object side, a first positive meniscus lens having a convex lens surface facing an object side, and a second positive meniscus lens having a convex lens surface facing an object side, in order to correct spherical aberration and astigmatism. Furthermore, it is also preferable for condition (20) to be satisfied.

Condition (20) stipulates the appropriate range for the ratio between a radius of curvature of an image-side lens surface of the positive meniscus lens and a radius of curvature of an image-side surface of the positive meniscus lens. When either the upper limit or lower limit in condition (20) is exceeded, fluctuations in the spherical aberrations and astigmatism during focussing and zooming become large.

In addition, it is desirable for the negative meniscus lens and the positive meniscus lens to be cemented in order to make assembly more efficient.

BRIEF DESCRIPTION OF THE DRAWINGS

The invention will be described in conjunction with the following drawings, in which like reference numerals designate like elements and wherein:

FIG. 2 is a diagram of focal length changes with the movement loci for the respective lens units of the first embodiment during zooming;

FIGS. 4(a)–4(d) are graphs of various aberrations at an intermediate focal length state for the first embodiment;

FIGS. 5(a)–5(d) are graphs of various aberrations at a maximum telephoto state for the first embodiment;

FIG. 7 is a diagram of focal length changes with the movement loci for the respective lens units of a second embodiment during zooming;

FIGS. 8(a)–8(d) are graphs of various aberrations at a maximum wide-angle state for the second embodiment;

FIGS. 9(a)–9(d) are graphs of various aberrations at an intermediate focal length state for the second embodiment;

FIGS. 10(a)–10(d) are graphs of various aberrations at a maximum telephoto state for the second embodiment;

FIGS. 12(a)–12(d) are graphs of various aberrations at a maximum wide-angle state for the third embodiment;

FIGS. 13(a)–13(d) are graphs of various aberrations at an intermediate focal length state for the third embodiment;

DETAILED DESCRIPTION OF PREFERRED EMBODIMENTS

Figure 1:
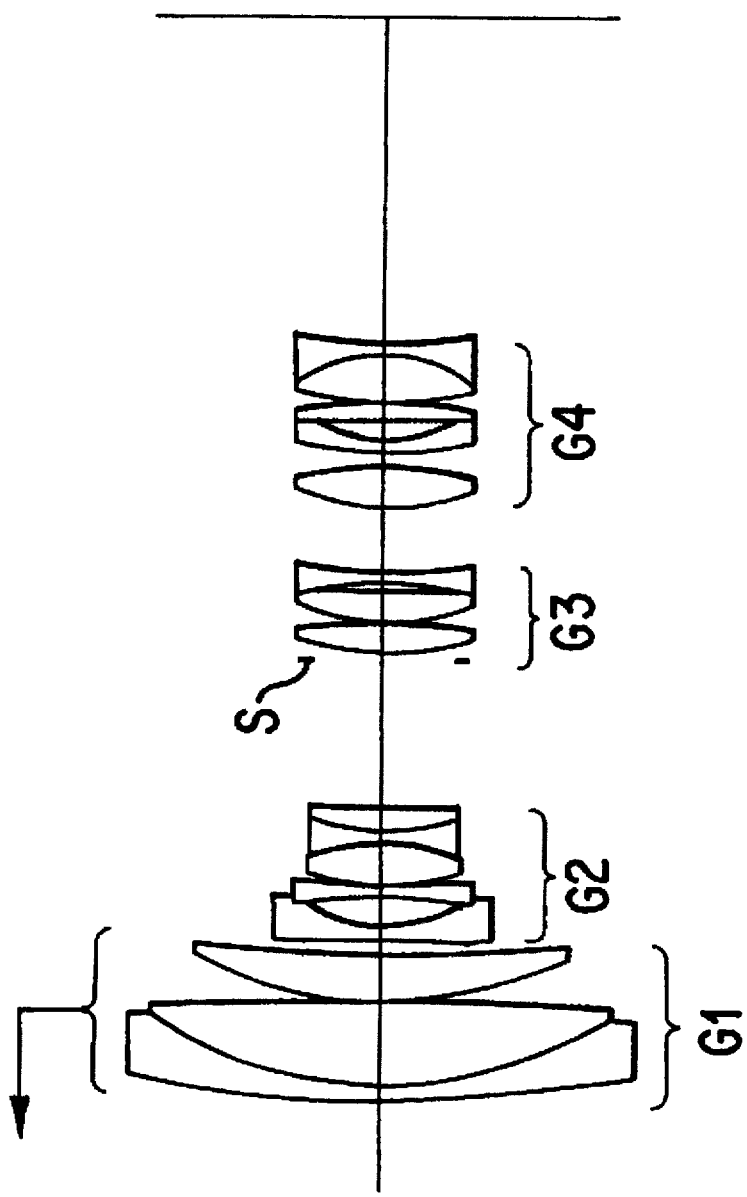
FIG. 1 is a cross-sectional view of a zoom lens according to a first embodiment of the invention.
Figure 3C:
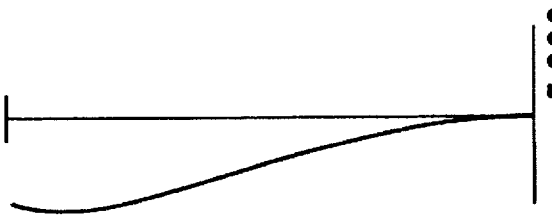
FIGS. 3(a)–3(d) are graphs of various aberrations at a maximum wide-angle state for the first embodiment.
Figure 3B:
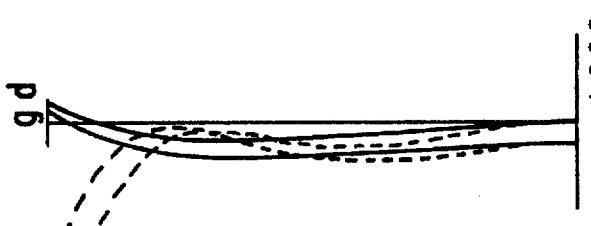
Figure 3D:
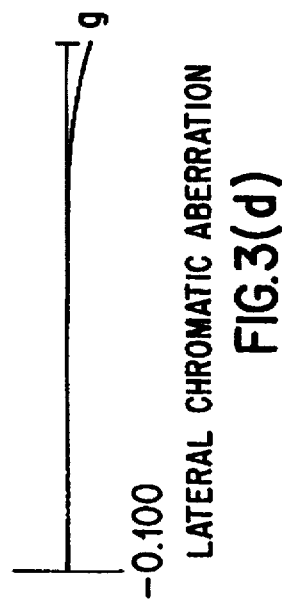
Figure 3A:
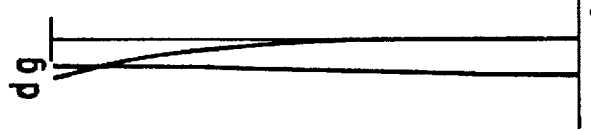

FIG. 1 is a cross-sectional view of a zoom lens according to a first embodiment of the invention. The zoom lens of FIG. 1 includes, in order from the object side, a positive first lens unit G1 including a positive cemented lens having a negative meniscus lens with a convex lens surface facing an object side and a biconvex lens, and a positive meniscus lens having a convex surface facing an object side; a negative second lens unit G2 including two biconcave lenses, a biconvex lens, and a negative cemented lens having a biconcave lens and a positive meniscus lens with a convex lens surface facing an object side; a stop S; a positive third lens unit G3 including two biconvex lenses and a biconcave lens; and a positive fourth lens unit G4 including a biconvex lens, a negative meniscus lens with a convex lens surface facing an object side, a biconvex lens, and a negative cemented lens having a biconvex lens and a biconcave lens.

The lens surface closest to the object in the second lens unit G2 and the lens surface closest to the object in the fourth lens unit G4 are aspheric surfaces, and the aspheric surface shapes are given by the following equation:

$$c(y)=y^2/\{r\cdot[1+(1-k\cdot y^2/r^2)^{1/2}]\}+c_2\cdot y^2+c_4\cdot y^4+c_6\cdot y^6+c_8\cdot y^8+c_{10}\cdot y^{10} \quad (a)$$

where C(y) is the distance along the optical axis direction from the tangent plane at the apex of the aspheric surface to the position of the aspheric surface at height y; r is a reference radius of curvature near the optical axis; k is a conical coefficient; and $C_i$ is an aspheric surface coefficient of ith order.

During zooming from the maximum wide-angle state to the maximum telephoto state, the first through the fourth lens units all move in the object direction, such that the distance between the first lens unit G1 and the second lens unit G2 increases, the distance between the second lens unit G2 and the third lens unit G3 decreases, and the distance between the third lens unit G3 and the fourth lens unit G4 decreases.

In addition, focussing from distant objects to close objects is conducted by causing the second lens unit G2 to move toward an object side.

The values of the various dimensions of the first embodiment of the invention are shown in TABLE 1 below. Among the dimensions of the first embodiment, f designates the focal length, F designates the F number and $2\omega$ designates the field angle. Furthermore, the numbers in the left column indicate the lens surface numbers in the order from an object side, r is the radius of curvature of the lens surface, d is the distance between the lens surfaces, and n and $\nu$ are the values of the index of refraction and the Abbe number with respect to the a d-line ($\lambda$=587.6 nm). The length of the diagonal of the effective picture plane is 43.2. Aspheric surfaces are indicated in TABLE 1 by the symbol * to the right of the surface number.

TABLES 3 and 5 that follow also use the same designations for the same type of lens data.

First Embodiment
f=28.80~70.00~194.00
F/3.63~5.01~5.85
$2\omega$=76.61~33.27~12.26°

TABLE 1

|   | r | d | ν | n |
|---|---|---|---|---|
| 1 | 180.4099 | 1.80 | 28.6 | 1.79504 |
| 2 | 52.6893 | 9.90 | 65.4 | 1.60300 |
| 3 | −605.3990 | 0.10 | | |
| 4 | 51.2562 | 5.70 | 52.3 | 1.74810 |
| 5 | 225.6528 | 1.70~17.77~37.68 | | |
| 6* | −449.3097 | 1.50 | 43.4 | 1.84042 |
| 7 | 17.4865 | 3.90 | | |
| 8 | −61.4256 | 1.20 | 45.4 | 1.79668 |
| 9 | 81.9064 | 0.10 | | |
| 10 | 30.3406 | 4.70 | 27.6 | 1.74077 |
| 11 | −30.3406 | 0.70 | | |
| 12 | −20.6289 | 1.20 | 45.4 | 1.79668 |
| 13 | 32.4753 | 2.40 | 23.0 | 1.86074 |
| 14 | 164.1643 | 18.15~9.73~1.80 | | |
| 15 | (stop) | 0.70 | | |
| 16 | 37.5993 | 3.50 | 47.1 | 1.62374 |
| 17 | −80.2550 | 0.10 | | |
| 18 | 25.8535 | 3.70 | 64.1 | 1.51680 |
| 19 | −364.9115 | 1.00 | | |
| 20 | −47.3393 | 1.20 | 25.5 | 1.80458 |
| 21 | 92.9472 | 7.76~3.49~1.06 | | |
| 22* | 24.2174 | 5.00 | 70.4 | 1.48749 |
| 23 | −40.0707 | 1.60 | | |
| 24 | 45.4318 | 1.50 | 33.9 | 1.80384 |
| 25 | 19.2324 | 2.00 | | |
| 26 | 76.4914 | 2.70 | 40.8 | 1.58144 |
| 27 | −62.9262 | 0.10 | | |
| 28 | 51.7632 | 5.90 | 41.4 | 1.57501 |
| 29 | −17.0000 | 1.20 | 45.4 | 1.79668 |
| 30 | 68.8222 | | | |

(Aspheric Surface Data)
Conical Coefficient k = 1.0000

| Aspheric Coefficient | Surface 6 | Surface 22 |
|---|---|---|
| $C_2$ | 0.0000 | 0.0000 |
| $C_4$ | 1.0079 E-5 | −2.3691 E-5 |
| $C_6$ | 1.2863 E-8 | 7.3476 E-10 |
| $C_8$ | −1.1779 E-10 | −1.8113 E-11 |
| $C_{10}$ | 7.2601 E-13 | 0.0000 |

TABLE 1-continued

| Condition | Condition Satisfying Data |
|---|---|
| (8) | lf2l/ft = 0.0715 |
| (9) | Z34 = 2.18 |
| (10) | mv1/fw = 1.85 |
| (11) | mv2/mv1 = 0.326 |
| (12) | mv3/mv4 = 0.834 |
| (13) | mv4/fw = 1.40 |
| (14) | Z2/Z34 = 1.42 |
| (15) | f3/f4 = 0.758 |
| (16) | T4/ft = 0.103 |
| (17) | (Bf4 + T4/2)/f4 = 0.822 |
| (18) | A/f4 = 0.0289 |

The zooming displacements m1, m2, m3 and m4 of the first, second, third and fourth lens units respectively and the ratio K of the zooming displacements of the first lens unit and the second lens unit at the focal length f of the zoom lens of the first embodiment are shown in TABLE 2 below.

TABLE 2

| f | m1 | m2 | m3 | m4 | Ratio K |
|---|---|---|---|---|---|
| 28.8 | 0.00 | 0.00 | 0.00 | 0.00 | — |
| 29.99 | 1.00 | 0.26 | 0.77 | 0.98 | 0.26 |
| 31.20 | 2.00 | 0.55 | 1.53 | 1.96 | 0.27 |
| 32.42 | 3.00 | 0.85 | 2.29 | 2.93 | 0.28 |
| 33.66 | 4.00 | 1.17 | 3.04 | 3.88 | 0.29 |
| 34.91 | 5.00 | 1.50 | 3.78 | 4.81 | 0.30 |
| 36.17 | 6.00 | 1.84 | 4.49 | 5.72 | 0.31 |
| 37.44 | 7.00 | 2.18 | 5.20 | 6.61 | 0.31 |
| 38.73 | 8.00 | 2.54 | 5.90 | 7.48 | 0.32 |
| 40.04 | 9.00 | 2.90 | 6.58 | 8.33 | 0.32 |
| 41.36 | 10.00 | 3.27 | 7.27 | 9.18 | 0.33 |
| 42.72 | 11.00 | 3.65 | 7.95 | 10.02 | 0.33 |
| 44.09 | 12.00 | 4.05 | 8.64 | 10.85 | 0.34 |
| 45.50 | 13.00 | 4.45 | 9.34 | 11.70 | 0.34 |
| 46.93 | 14.00 | 4.88 | 10.04 | 12.54 | 0.35 |
| 48.39 | 15.00 | 5.32 | 10.76 | 13.40 | 0.35 |
| 49.88 | 16.00 | 5.79 | 11.49 | 14.28 | 0.36 |
| 51.41 | 17.00 | 6.28 | 12.25 | 15.17 | 0.37 |
| 52.96 | 18.00 | 6.79 | 13.01 | 16.08 | 0.38 |
| 54.53 | 19.00 | 7.32 | 13.79 | 16.99 | 0.39 |
| 56.13 | 20.00 | 7.85 | 14.57 | 17.91 | 0.39 |
| 57.76 | 21.00 | 8.39 | 15.35 | 18.82 | 0.40 |
| 59.42 | 22.00 | 8.94 | 16.13 | 19.72 | 0.41 |
| 61.11 | 23.00 | 9.47 | 16.89 | 20.61 | 0.41 |
| 62.83 | 24.00 | 10.00 | 17.63 | 21.47 | 0.42 |
| 64.60 | 25.00 | 10.51 | 18.34 | 22.31 | 0.42 |
| 66.41 | 26.00 | 10.99 | 19.03 | 23.11 | 0.42 |
| 68.28 | 27.00 | 11.44 | 19.68 | 23.87 | 0.42 |
| 70.23 | 28.00 | 11.86 | 20.30 | 24.58 | 0.42 |
| 72.26 | 29.00 | 12.23 | 20.86 | 25.25 | 0.42 |
| 74.38 | 30.00 | 12.57 | 21.39 | 25.86 | 0.42 |
| 76.62 | 31.00 | 12.87 | 21.89 | 26.45 | 0.42 |
| 78.97 | 32.00 | 13.14 | 22.36 | 26.99 | 0.41 |
| 81.46 | 33.00 | 13.39 | 22.80 | 27.52 | 0.41 |
| 84.10 | 34.00 | 13.61 | 23.23 | 28.02 | 0.40 |
| 86.89 | 35.00 | 13.81 | 23.65 | 28.52 | 0.39 |
| 89.86 | 36.00 | 14.01 | 24.07 | 29.01 | 0.39 |
| 93.00 | 37.00 | 14.19 | 24.48 | 29.50 | 0.38 |
| 96.35 | 38.00 | 14.37 | 24.90 | 29.99 | 0.38 |
| 99.90 | 39.00 | 14.56 | 25.34 | 30.50 | 0.37 |
| 103.66 | 40.00 | 14.75 | 25.79 | 31.03 | 0.37 |
| 107.65 | 41.00 | 14.95 | 26.27 | 31.59 | 0.36 |
| 111.89 | 42.00 | 15.16 | 26.76 | 32.16 | 0.36 |
| 116.40 | 43.00 | 15.38 | 27.27 | 32.76 | 0.36 |
| 121.20 | 44.00 | 15.61 | 27.81 | 33.39 | 0.35 |
| 126.33 | 45.00 | 15.84 | 28.36 | 34.04 | 0.35 |
| 131.81 | 46.00 | 16.08 | 28.94 | 34.73 | 0.35 |
| 137.69 | 47.00 | 16.33 | 29.54 | 35.44 | 0.35 |
| 144.03 | 48.00 | 16.58 | 30.17 | 36.18 | 0.35 |
| 150.90 | 49.00 | 16.83 | 30.81 | 36.94 | 0.34 |
| 158.47 | 50.00 | 17.06 | 31.46 | 37.72 | 0.34 |
| 166.94 | 51.00 | 17.25 | 32.13 | 38.52 | 0.34 |

TABLE 2-continued

| f | m1 | m2 | m3 | m4 | Ratio K |
|---|----|----|----|----|---------|
| 176.70 | 52.00 | 17.40 | 32.81 | 39.32 | 0.33 |
| 188.46 | 53.00 | 17.44 | 33.49 | 40.14 | 0.33 |
| 204.08 | 54.00 | 17.29 | 34.17 | 40.95 | 0.32 |

FIG. 2 is a diagram of focal length change with the movement loci of the respective lens units of the first embodiment 1 during zooming.

FIGS. 3(a)–3(d), 4(a)–4(d) and 5(a)–5(d) show various aberrations of the first embodiment at a maximum wide-angle state, at an intermediate focal length state and at a maximum telephoto state, respectively. In these graphs, F No denotes F number, Y denotes image height, d denotes a d-line (λ=587.6 nm) and g denotes a g-line (λ=435.6 nm). In the astigmatism graphs, the solid line represents the sagittal image plane while the broken line represents the meridional image plane.

From the aberration graphs, it is clear that the first embodiment corrects aberrations well, and has superior imaging properties.

Figure 6:
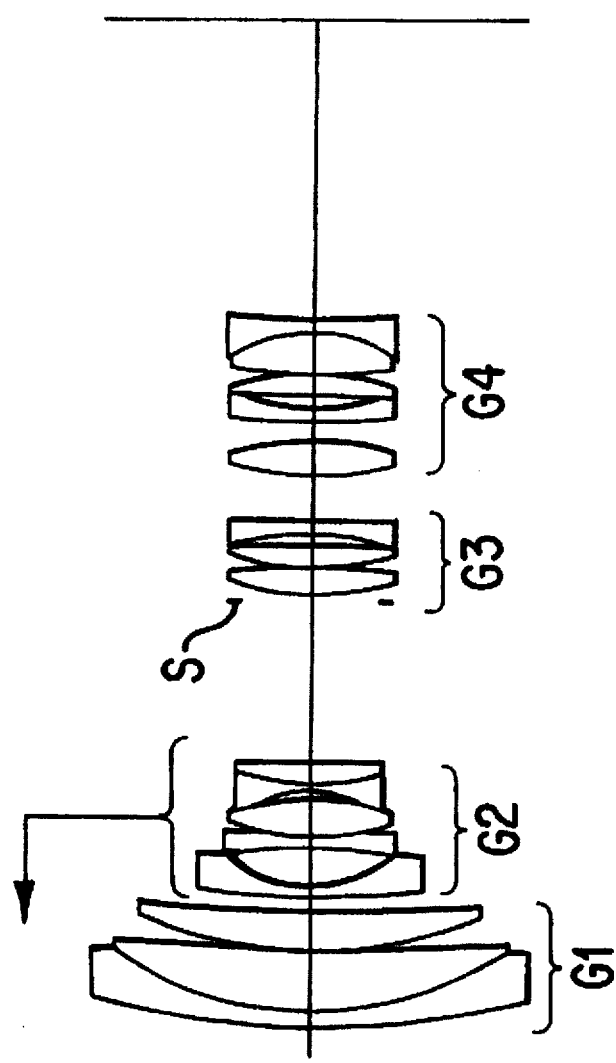
FIG. 6 is a cross-sectional view of a zoom lens according to a second embodiment of the invention.

FIG. 6 is a cross-sectional view of a zoom lens according to a second embodiment of the invention, and includes, in order from an object side, a positive first lens unit G1 including a positive cemented lens having a negative meniscus lens with a convex lens surface facing an object side and a positive meniscus lens with a convex lens surface facing an object side, and a positive meniscus lens having a convex lens surface facing an object side; a negative second lens unit G2 including a negative meniscus lens with a lens surface facing an object side, a biconcave lens, a biconvex lens, and a negative cemented lens having a biconcave lens and a positive meniscus lens with a convex lens surface facing an object side; a stop S; a positive third lens unit G3 including two biconvex lenses and a biconcave lens; and a positive fourth lens unit G4 including a biconvex lens, a negative meniscus lens with a convex lens surface facing an object side, a biconvex lens, and a negative cemented lens having a biconvex lens and a biconcave lens.

The lens surface closest to the object side in the second lens unit G2 and the lens surface closest to the object side in the fourth lens unit G4 are aspheric surfaces, and the aspheric surface shapes are again given by equation (a) as discussed previously.

During zooming from the maximum wide-angle state to the maximum telephoto state, the first through the fourth lens units all move toward the object direction, such that the distance between the first lens unit G1 and the second lens unit G2 increases, the distance between the second lens unit G2 and the third lens unit G3 decreases, and the distance between the third lens unit G3 and the fourth lens unit G4 decreases.

In addition, focussing from distant objects to close objects is conducted by causing the second lens unit G2 to move toward an object side.

The values of the various dimensions of embodiment 2 in the present invention are shown in TABLE 3 below. The length of the diagonal of the effective picture plane is 43.2.

Second Embodiment
f=28.80~70.02~194.04
F/3.42~4.72~5.88
2ω=76.49~33.16~12.25°

TABLE 3

| | r | d | ν | n |
|---|---|---|---|---|
| 1 | 110.1202 | 2.00 | 25.5 | 1.80458 |
| 2 | 45.3047 | 7.90 | 50.8 | 1.65844 |
| 3 | 292.3390 | 0.10 | | |
| 4 | 56.1115 | 5.10 | 51.1 | 1.73350 |
| 5 | 302.5270 | 2.05–19.66–38.66 | | |
| 6 | 101.7605 | 1.50 | 43.4 | 1.84042 |
| 7 | 17.2357 | 5.50 | | |
| 8 | –46.3899 | 1.20 | 45.44 | 1.79668 |
| 9 | 76.8704 | 0.10 | | |
| 10 | 31.7453 | 4.60 | 27.6 | 1.74077 |
| 11 | –39.1956 | 1.00 | | |
| 12 | –22.6074 | 1.20 | 45.4 | 1.79668 |
| 13 | 36.4138 | 2.50 | 23.0 | 1.86074 |
| 14 | 488.1784 | 20.59–10.93–1.80 | | |
| 15 | (stop) | 0.70 | | |
| 16 | 32.1384 | 3.50 | 50.8 | 1.65844 |
| 17 | –88.1565 | 0.10 | | |
| 18 | 46.5535 | 2.80 | 50.8 | 1.65844 |
| 19 | –259.3912 | 1.25 | | |
| 20 | –37.5471 | 1.20 | 23.0 | 1.86074 |
| 21 | 461.1561 | 6.30–2.69–1.12 | | |
| 22 | 32.5992 | 4.60 | 60.2 | 1.51835 |
| 23 | –35.5563 | 2.50 | | |
| 24 | 80.3100 | 1.50 | 33.9 | 1.80384 |
| 25 | 23.2292 | 1.90 | | |
| 26 | 174.5852 | 2.80 | 42.0 | 1.66755 |
| 27 | –51.0425 | 0.10 | | |
| 28 | 62.1005 | 6.10 | 41.4 | 1.57501 |
| 29 | –17.0000 | 1.20 | 45.4 | 1.79668 |
| 30 | 105.4175 | | | |

(Aspheric Surface Data)
Conical Coefficient k = 1.0000

| Aspheric Coefficient | Surface 6 | Surface 22 |
|---|---|---|
| $C_2$ | 0.0000 | 0.0000 |
| $C_4$ | 2.5569 E-6 | –1.9378 E-5 |
| $C_6$ | 6.5972 E-9 | 3.2953 E-9 |
| $C_8$ | –3.0515 E-11 | –1.6278 E-12 |
| $C_{10}$ | 2.3865 E-13 | 0.0000 |

| Condition | Condition Satisfying Data |
|---|---|
| (8) | lf2l/ft = 0.0759 |
| (9) | Z34 = 2.22 |
| (10) | mv1/fw = 1.88 |
| (11) | mv2/mv1 = 0.322 |
| (12) | mv3/mv4 = 0.875 |
| (13) | mv4/fw = 1.44 |
| (14) | Z2/Z34 = 1.37 |
| (15) | f3/f4 = 0.721 |
| (16) | T4/ft = 0.107 |
| (17) | (Bf4 + T4/2)/f4 = 0.842 |
| (18) | A/f4 = 0.0411 |
| (19) | lβ2tl = 0.819 |
| (20) | r3/r5 = 0.966 |

The zooming displacements m1, m2, m3 and m4 of the first, second, third and fourth lens units respectively and the ratio K of the zooming displacements of the first lens unit and the second lens unit at the focal length f of the zoom lens of the second embodiment are shown in TABLE 4 below.

TABLE 4

| f | m1 | m2 | m3 | m4 | Ratio K |
|---|----|----|----|----|---------|
| 28.8 | 0.00 | 0.00 | 0.00 | 0.00 | — |
| 30.00 | 1.00 | 0.20 | 0.78 | 0.93 | 0.20 |
| 31.23 | 2.00 | 0.40 | 1.54 | 1.87 | 0.20 |
| 32.49 | 3.00 | 0.61 | 2.28 | 2.80 | 0.20 |
| 33.78 | 4.00 | 0.84 | 3.01 | 3.72 | 0.21 |
| 35.09 | 5.00 | 1.08 | 3.73 | 4.64 | 0.22 |

TABLE 4-continued

| f | m1 | m2 | m3 | m4 | Ratio K |
|---|---|---|---|---|---|
| 36.42 | 6.00 | 1.34 | 4.46 | 5.54 | 0.22 |
| 37.77 | 7.00 | 1.63 | 5.18 | 6.44 | 0.23 |
| 39.13 | 8.00 | 1.94 | 5.91 | 7.33 | 0.24 |
| 40.52 | 9.00 | 2.26 | 6.63 | 8.21 | 0.25 |
| 41.92 | 10.00 | 2.59 | 7.35 | 9.08 | 0.26 |
| 43.35 | 11.00 | 2.95 | 8.07 | 9.94 | 0.27 |
| 44.80 | 12.00 | 3.31 | 8.79 | 10.79 | 0.28 |
| 46.27 | 13.00 | 3.68 | 9.50 | 11.63 | 0.28 |
| 47.77 | 14.00 | 4.06 | 10.21 | 12.47 | 0.29 |
| 49.30 | 15.00 | 4.44 | 10.91 | 13.29 | 0.30 |
| 50.86 | 16.00 | 4.83 | 11.61 | 14.11 | 0.30 |
| 52.45 | 17.00 | 5.22 | 12.30 | 14.92 | 0.31 |
| 54.09 | 18.00 | 5.61 | 12.99 | 15.72 | 0.31 |
| 55.76 | 19.00 | 6.01 | 13.67 | 16.52 | 0.32 |
| 57.46 | 20.00 | 6.41 | 14.34 | 17.30 | 0.32 |
| 59.21 | 21.00 | 6.80 | 15.01 | 18.08 | 0.32 |
| 61.01 | 22.00 | 7.20 | 15.68 | 18.85 | 0.33 |
| 62.85 | 23.00 | 7.60 | 16.34 | 19.61 | 0.33 |
| 64.74 | 24.00 | 8.00 | 16.99 | 20.36 | 0.33 |
| 66.68 | 25.00 | 8.39 | 17.64 | 21.10 | 0.34 |
| 68.68 | 26.00 | 8.79 | 18.29 | 21.84 | 0.34 |
| 70.73 | 27.00 | 9.18 | 18.93 | 22.57 | 0.34 |
| 72.85 | 28.00 | 9.57 | 19.57 | 23.28 | 0.34 |
| 75.04 | 29.00 | 9.96 | 20.20 | 23.99 | 0.34 |
| 77.31 | 30.00 | 10.34 | 20.82 | 24.69 | 0.34 |
| 79.66 | 31.00 | 10.72 | 21.44 | 25.38 | 0.35 |
| 82.10 | 32.00 | 11.09 | 22.05 | 26.06 | 0.35 |
| 84.65 | 33.00 | 11.45 | 22.66 | 26.73 | 0.35 |
| 87.31 | 34.00 | 11.79 | 23.26 | 27.39 | 0.35 |
| 90.10 | 35.00 | 12.13 | 23.84 | 28.04 | 0.35 |
| 93.04 | 36.00 | 12.45 | 24.42 | 28.68 | 0.35 |
| 96.13 | 37.00 | 12.76 | 24.99 | 29.31 | 0.34 |
| 99.41 | 38.00 | 13.05 | 25.56 | 29.93 | 0.34 |
| 102.90 | 39.00 | 13.33 | 26.11 | 30.53 | 0.34 |
| 106.61 | 40.00 | 13.59 | 26.66 | 31.13 | 0.34 |
| 110.56 | 41.00 | 13.84 | 27.21 | 31.73 | 0.34 |
| 114.77 | 42.00 | 14.08 | 27.77 | 32.34 | 0.34 |
| 119.27 | 43.00 | 14.32 | 28.34 | 32.96 | 0.33 |
| 124.07 | 44.00 | 14.56 | 28.92 | 33.59 | 0.33 |
| 129.19 | 45.00 | 14.80 | 29.53 | 34.25 | 0.33 |
| 134.65 | 46.00 | 15.06 | 30.16 | 34.94 | 0.33 |
| 140.48 | 47.00 | 15.32 | 30.81 | 35.66 | 0.33 |
| 146.69 | 48.00 | 15.60 | 31.49 | 36.42 | 0.32 |
| 153.32 | 49.00 | 15.88 | 32.21 | 37.20 | 0.32 |
| 160.39 | 50.00 | 16.17 | 32.94 | 38.01 | 0.32 |
| 167.94 | 51.00 | 16.47 | 33.71 | 38.83 | 0.32 |
| 176.02 | 52.00 | 16.78 | 34.50 | 39.66 | 0.32 |
| 184.67 | 53.00 | 17.09 | 35.32 | 40.51 | 0.32 |
| 193.96 | 54.00 | 17.39 | 36.18 | 41.36 | 0.32 |
| 203.96 | 55.00 | 17.70 | 37.07 | 42.21 | 0.32 |

FIG. 7 is a diagram of focal length with the movement loci of the respective units of the second embodiment during zooming.

FIGS. 8(a)–8(d), 9(a)–9(d) and 10(a)–10(d) are graphs of various aberrations for the second embodiment at a maximum wide-angle state, at an intermediate focal length state and at maximum telephoto state, respectively. In these graphs, F No denotes F number, Y denotes image height, d denotes a d-line ($\lambda$=587.6 nm) and g denotes a g-line ($\lambda$=435.6 nm). In the astigmatism graphs, the solid line represents the sagittal image plane while the broken line represents the meridional image plane.

From the aberration graphs, it is clear that the second embodiment corrects the aberrations well, and has superior imaging properties.

In this way, with the invention it is possible to provide a low cost zoom lens that is compact and has a high zoom ratio.

Figure 11:
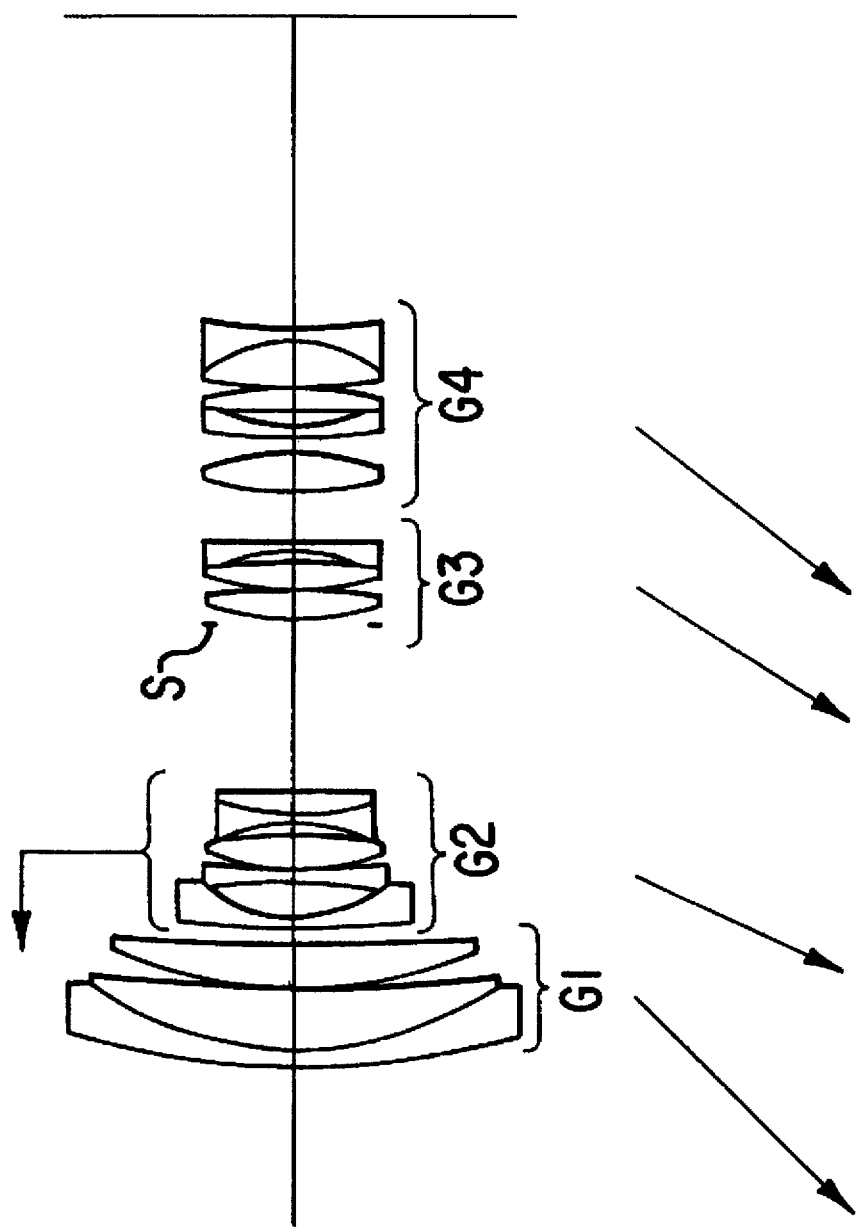
FIG. 11 is a cross-sectional view of a zoom lens according to a third embodiment of the invention with the movement loci for various lens units indicated.
Figure 14C:
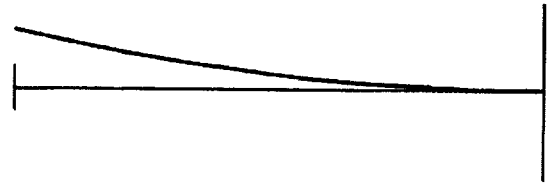
FIGS. 14(a)–14(d) are graphs of various aberrations at a maximum telephoto state for the third embodiment.
Figure 14B:
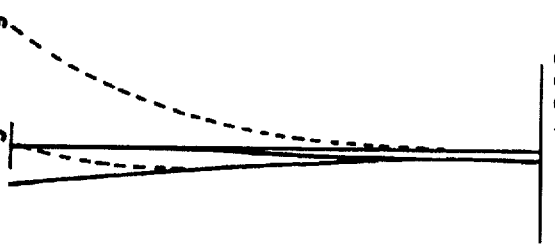
Figure 14D:
Figure 14A:

FIG. 11 is a cross-sectional view of a zoom lens according to a third embodiment, and includes, in order from an object side, a positive first lens unit G1 including a positive cemented lens having a negative meniscus lens with a convex lens surface facing an object side and a positive meniscus lens with a convex lens surface facing the object side, and a positive meniscus lens having a convex lens surface facing the object side; a negative second lens unit G2 including a negative meniscus lens having a convex lens surface facing an object side, a biconcave lens, a biconvex lens, and a negative cemented lens having a biconcave lens and a biconvex lens; a stop S; a positive third lens unit G3 including two biconvex lenses and a biconcave lens; and a positive fourth lens unit G4 including a biconvex lens, a negative meniscus lens with a convex lens surface facing an object side, a biconvex lens, and a negative cemented lens having a biconvex lens and a biconcave lens.

The lens surface closest to the object side in the second lens unit G2 and the lens surface closest to the object side in the fourth lens unit G4 are aspheric surfaces, and the aspheric surface shapes are given by equation (a) discussed previously.

During zooming from the maximum wide-angle state to the maximum telephoto state, the first through the fourth lens units all move in the object direction, such that the distance between the first lens unit and the second lens unit increases, the distance between the second lens unit and the third lens unit decreases, and the distance between the third lens unit and the fourth lens unit decreases.

In addition, focussing from distant objects to close objects is conducted by causing the second lens unit to move toward an object side.

The values of the various dimensions of the second embodiment of the invention are shown in TABLE 5 below. The length of the diagonal of the effective picture plane is 43.2.

Third Embodiment f=28.80~70.01~194.05
F/3.37~4.63~5.89
2$\omega$=76.60~33.13~12.27°

TABLE 5

| | r | d | v | n |
|---|---|---|---|---|
| 1 | 97.2063 | 2.00 | 28.6 | 1.79504 |
| 2 | 43.1354 | 7.60 | 65.4 | 1.60300 |
| 3 | 230.0059 | 0.10 | | |
| 4 | 53.6011 | 5.80 | 52.3 | 1.74820 |
| 5 | 332.4258 | 2.02~19.52~37.40 | | |
| 6* | 145.8451 | 1.50 | 43.4 | 1.84042 |
| 7 | 16.7741 | 4.85 | | |
| 8 | −54.6971 | 1.20 | 45.4 | 1.79668 |
| 9 | 71.9243 | 0.10 | | |
| 10 | 31.1827 | 4.50 | 27.6 | 1.74077 |
| 11 | −43.7549 | 1.25 | | |
| 12 | −22.0043 | 1.20 | 45.4 | 1.79668 |
| 13 | 39.3250 | 2.60 | 23.0 | 1.86074 |
| 14 | −556.5762 | 20.40~10.92~1.80 | | |
| 15 | (stop) | 0.70 | | |
| 16 | 33.5095 | 3.50 | 47.1 | 1.62374 |
| 17 | −86.9107 | 0.10 | | |
| 18 | 35.3386 | 3.50 | 70.4 | 1.48749 |
| 19 | −85.2516 | 0.90 | | |
| 20 | −35.2615 | 1.20 | 25.5 | 1.80458 |
| 21 | 260.8422 | 6.39~2.68~1.10 | | |
| 22* | 33.3648 | 4.80 | 64.1 | 1.51680 |
| 23 | −34.8625 | 2.00 | | |
| 24 | 59.9602 | 1.50 | 33.9 | 1.80384 |
| 25 | 23.2197 | 1.90 | | |
| 26 | 152.1363 | 2.90 | 42.0 | 1.66755 |
| 27 | −49.8111 | 0.10 | | |
| 28 | 63.6289 | 6.00 | 41.4 | 1.57501 |
| 29 | −17.0000 | 1.20 | 45.4 | 1.79668 |
| 30 | 66.6667 | | | |

TABLE 5-continued (Aspheric Surface Data)
Conical Coefficient k = 1.0000

| Aspheric Coefficient | Surface 6 | Surface 22 |
| --- | --- | --- |
| $C_2$ | 0.0000 | 0.0000 |
| $C_4$ | 4.4896 E-6 | −1.9979 E-5 |
| $C_6$ | 8.2215 E-9 | 1.0821 E-8 |
| $C_8$ | −5.3162 E-11 | −1.0725 E-11 |
| $C_{10}$ | 2.7795 E-13 | 0.0000 |

| Condition | Condition Satisfying Data |
| --- | --- |
| (8) | lf2l/ft = 0.0751 |
| (9) | Z34 = 2.25 |
| (10) | mv1/fw = 1.87 |
| (11) | mv2/mv1 = 0.344 |
| (12) | mv3/mv4 = 0.875 |
| (13) | mv4/fw = 1.48 |
| (14) | Z2/Z34 = 1.33 |
| (15) | f3/f4 = 0.758 |
| (16) | T4/ft = 0.105 |
| (17) | (Bf4 + T4/2)/f4 = 0.833 |
| (18) | A/f4 = 0.0338 |
| (19) | lβ2tl = 0/819 |
| (20) | r3/r5 = 0.713 |

FIGS. 12(a)–12(d), 13(a)–13(d) and 14(a)–14(d) are graphs of various aberrations of the third embodiment at a maximum wide-angle state, at an intermediate focal length state and at a maximum telephoto state, respectively. In these graphs, F No denotes F number, Y denotes image height, d denotes a d-line (λ=587.6 nm) and g denotes a g-line (λ=435.6 nm). In the astigmatism graphs, the solid line represents the sagittal image plane while the broken line represents the meridional image plane.

From the aberration graphs, it is clear that the present embodiment corrects the aberrations well, and has superior imaging properties.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A high zoom ratio lens, comprising in order from an object side:

a first lens unit having positive refractive power;

a second lens unit having negative refractive power; and a third lens unit having positive refractive power, wherein during zooming from a maximum wide-angle state to a maximum telephone state, said first, second and third lens units move toward the object such that the distance between said first lens unit and said second lens unit increases and the distance between said second lens unit and said third lens unit decreases, and wherein the following conditions are satisfied:

0.15<K(f)<0.45 for fw<f<2fw 0.25<K(f)<0.5 for 2fw<f<3fw 0.3<K(f)<0.45 for 3fw<f<4fw 0.25<K(f)<0.4 for 4fw<f<5fw 0.2<K(f)<0.4 for 5fw<f where fw=focal length of the entire zoom lens at the maximum wide-angle state, f=focal length of the entire zoom lens at any focal length state between the maximum wide-angle state and the maximum telephoto state, K(f)=ratio of zooming displacements of said first lens unit and said second lens unit respectively from the maximum wide-angle state to the focal length state having the focal length f for the entire zoom lens.

2. The high zoom ratio zoom lens of claim 1, wherein the following conditions are satisfied:

K(ft)<K(5fw)<K(3fw)

K(1.5fw)<K(2fw);

where:

K(ft)=the ratio of the zooming displacements of the first and second lens units from the maximum wide-angle state to the maximum telephoto state;

K(5fw)=the ratio of the zooming displacements of the first and second lens units from the maximum wide-angle state to the focal length state having a focal length for the entire zoom lens of 5fw;

K(3fw)=the ratio of the zooming displacements of the first and second lens units from the maximum wide-angle state to the focal length state having a focal length for the entire zoom lens of 3fw;

K(2fw)=the ratio of the zooming displacements of the first and second lens units from the maximum wide-angle state to the focal length state having a focal length for the entire zoom lens of 2fw; and K(1.5fw)=the ratio of the zooming displacements of the first and second lens units from the maximum wide-angle state to the focal length state having a focal length for the entire zoom lens of 1.5fw.

3. The high zoom ratio zoom lens of claim 2, further comprising a positive fourth lens unit on an image side of said third lens unit, wherein during zooming from the maximum wide-angle state to the maximum telephoto state, said fourth lens unit is caused to move toward the object direction such that the distance between the third lens unit and the fourth lens unit decreases.

4. A high zoom ratio lens comprising in order from an object side:

a first lens unit having positive refractive power;

a second lens unit having negative refractive power;

a third lens unit having positive refractive power; and a fourth lens unit having positive refractive power, wherein during zooming from a maximum wide-angle state to a maximum telephoto state, said first, second, third and fourth lens units are caused to move toward the object such that the distance between said first lens unit and said second lens unit increases, the distance between said second lens unit and said third lens unit decreases, and the distance between said third lens unit and said fourth lens unit decreases, and wherein the following conditions are satisfied:

0.05<lf2l/ft<0.10 (f2<0)

Z34>2 mv1/fw>1.5

0.2<mv2/mv1<0.5 where
- f2=focal length of said second lens unit,
- ft=focal length of the entire zoom lens at the maximum telephoto state,
- fw=focal length of the entire zoom lens at the maximum wide-angle state,
- Z34=ratio of the combined imaging magnification of said third lens unit and said fourth lens unit at the maximum telephoto state to the combined imaging magnification of said third lens unit and said fourth lens unit at the maximum wide-angle state,
- mv1=displacement of said first lens unit during zooming from the maximum wide-angle state to the maximum telephoto state, and
- mv2=displacement of said second lens unit during zooming from the maximum wide-angle state to the maximum telephoto state; and wherein the zoom lens includes a focal length shorter than a length of a diagonal of an effective picture plane of the zoom lens and a focal length longer than three times the length of the diagonal of the effective picture plane.

5. The high zoom ratio zoom lens of claim 4, wherein the following conditions are satisfied:

$$0.7 < mv3/mv4 < 0.95$$

$$1.1 < mv4/fw < 1.8$$

where
- mv3=displacement of said third lens unit during zooming from the maximum wide-angle state to the maximum telephoto state, and
- mv4=displacement of said fourth lens unit during zooming from the maximum wide-angle state to the maximum telephoto state.

6. The high zoom ratio zoom lens of claim 4, wherein the following condition is satisfied:

$$1.2 < Z2/Z34 < 1.6$$

where Z2=ratio of the imaging magnification of the second lens unit at the maximum telephoto state to the imaging magnification of the second lens unit at the maximum wide-angle state.

7. The high zoom ratio zoom lens of claim 4, wherein the following condition is satisfied:

$$0.5 < f3/f4 < 1.0$$

where
- f3=focal length of said third lens unit, and
- f4=focal length of said fourth lens unit.

8. The high zoom ratio zoom lens of claim 4, wherein the fourth lens unit comprises, in order from the object side, a positive biconvex lens and a negative meniscus lens having a convex lens surface facing the object side, and wherein the lens surface of the positive biconvex lens on the object side is aspheric.

9. The high zoom ratio zoom lens of claim 8, wherein the following condition is satisfied:

$$0.05 < T4/f4 < 0.15$$

where T4=on-axis thickness of the fourth lens unit.

10. The high zoom ratio zoom lens of claim 9, wherein the following condition is satisfied:

$$0.7 < (Bf4 + T4/2)/f4 < 1.0$$

where
- Bf4=back focus of said fourth lens unit alone, and
- f4=focal length of said fourth lens unit.

11. The high zoom ratio zoom lens of claim 8, wherein the following condition is satisfied:

$$0.01 < A/f4 < 0.1$$

where
- A=distance between said positive biconvex lens and said negative meniscus lens, and
- f4=focal length of the fourth lens unit.

12. The high zoom ratio zoom lens of claim 4, wherein focussing from distant objects to close objects is achieved by causing the second lens unit to move in the direction of the object, and wherein the following conditions are satisfied:

$$0.7 < |\beta 2t| < 0.9 \quad (\beta 2t < 0)$$

where $\beta 2t$ is the imaging magnification of said second lens unit at the maximum telephoto state.

13. The high zoom ratio zoom lens of claim 12, wherein the first lens unit comprises, in order from the object side, a negative meniscus lens having a convex lens surface facing the object side, a first positive meniscus lens having a convex lens surface facing the object side, and a second positive meniscus lens having a convex lens surface facing the object side.

14. The high zoom ratio zoom lens of claim 13, wherein the following condition is satisfied:

$$0.5 < r3/r5 < 2$$

where
- r3=radius of curvature of a lens surface of said first positive meniscus lens on the side toward the image, and
- r5=radius of curvature of a lens surface of said second positive meniscus lens on the side toward the image.

15. The high zoom ratio zoom lens of claim 13, wherein said negative meniscus lens and said first positive meniscus lens are cemented together.

16. A high zoom ratio zoom lens comprising in order from an object side:
- a first lens unit having positive refractive power;
- a second lens unit having negative refractive power;
- a third lens unit having positive refractive power; and
- a fourth lens unit having positive refractive power, wherein during zooming from a maximum wide-angle state to a maximum telephoto state, said first, second, third and fourth lens units move toward the object such that the distance between said first lens unit and said second lens unit increases, the distance between said second lens unit and said third lens unit decreases, and the distance between said third lens unit and said fourth lens unit decreases, and wherein the following conditions are satisfied:

$$0.15 < K(f) < 0.45 \text{ for } fw < f < 2fw$$

$$0.25 < K(f) < 0.5 \text{ for } 2fw < f < 3fw$$

$$0.3 < K(f) < 0.45 \text{ for } 3fw < f < 4fw$$

$$0.25 < K(f) < 0.4 \text{ for } 4fw < f < 5fw$$

$$0.2 < K(f) < 0.4 \text{ for } 5fw < f$$

$$0.05 < |f2|/f < 0.10 \ (f2 < 0)$$

$$Z34 > 2$$

$$mv1/fw > 1.5$$

$$0.2 < mv2/mv1 < 0.5$$

where
- fw=focal length of the entire zoom lens at the maximum wide-angle state,
- f=focal length of the entire zoom lens at any focal length state between the maximum wide-angle state and the maximum telephoto state,
- K(f)=ratio of zooming displacements of said first lens unit and said second lens unit respectively from the maximum wide-angle state to the focal length state having the focal length f for the entire zoom lens,
- f2=focal length of said second lens unit,
- ft=focal length of the entire zoom lens at the maximum telephoto state,
- Z34=ratio of the combined imaging magnification of said third lens unit and said fourth lens unit at the maximum telephoto state to the combined imaging magnification of said third lens unit and said fourth lens unit at a maximum wide-angle state,
- mv1=displacement of said first lens unit during zooming from the maximum wide-angle state to the maximum telephoto state, and
- mv2=displacement of said second lens unit during zooming from the maximum wide-angle state to the maximum telephoto state; and wherein the zoom lens includes a focal length shorter than a length of a diagonal of an effective picture plane of the zoom lens and a focal length longer than three times the length of the diagonal of the effective picture plane.

17. The high zoom ratio zoom lens of claim 16, wherein the following conditions are satisfied:

$$K(ft) < K(5fw) < K(3fw)$$

$$K(1.5fw) < K(2fw);$$

where:
- K(ft)=the ratio of the zooming displacements of the first and second lens units from the maximum wide-angle state to the maximum telephoto state;
- K(5fw)=the ratio of the zooming displacements of the first and second lens units from the maximum wide-angle state to the focal length state having a focal length for the entire zoom lens of 5fw;
- K(3fw)=the ratio of the zooming displacements of the first and second lens units from the maximum wide-angle state to the focal length state having a focal length for the entire zoom lens of 3fw;
- K(2fw)=the ratio of the zooming displacements of the first and second lens units from the maximum wide-angle state to the focal length state having a focal length for the entire zoom lens of 2fw; and
- K(1.5fw)=the ratio of the zooming displacements of the first and second lens units from the maximum wide-angle state to the focal length state having a focal length for the entire zoom lens of 1.5fw.

18. The high zoom ratio zoom lens of claim 16, wherein the following conditions are satisfied:

$$0.7 < mv3/mv4 < 0.95$$

$$1.1 < mv4/fw < 1.8$$

where
- mv3=displacement of said third lens unit during zooming from the maximum wide-angle state to the maximum telephoto state, and
- mv4=displacement of said fourth lens unit during zooming from the maximum wide-angle state to the maximum telephoto state.

19. The high zoom ratio zoom lens of claim 16, wherein the following condition is satisfied:

$$1.2 < Z2/Z34 < 1.6$$

where Z2=ratio of the imaging magnification of the second lens unit at the maximum telephoto state to the imaging magnification of the second lens unit at the maximum wide-angle state.

20. The high zoom ratio zoom lens of claim 16, wherein the following condition is satisfied:

$$0.5 < f3/f4 < 1.0$$

where
- f3=focal length of said third lens unit, and
- f4=focal length of said fourth lens unit.

* * * * *

UNITED STATES PATENT AND TRADEMARK OFFICE
CERTIFICATE OF CORRECTION

PATENT NO. : 5,694,253
DATED : December 2, 1997
INVENTOR(S) : Atsushi Shibayama

It is certified that error appears in the above-identified patent and that said Letters Patent is hereby corrected as shown below:

Column 15,
Line 53, replace "telephone" with -- telephoto --.

Signed and Sealed this

Twentieth Day of December, 2005

JON W. DUDAS
*Director of the United States Patent and Trademark Office*